R. V. CONVERSE.
SHOCK ABSORBER.
APPLICATION FILED OCT. 11, 1920.

1,415,799.

Patented May 9, 1922.
2 SHEETS—SHEET 1.

Inventor
Ray V. Converse
By
Attorney

R. V. CONVERSE.
SHOCK ABSORBER.
APPLICATION FILED OCT. 11, 1920.
1,415,799.
Patented May 9, 1922.
2 SHEETS—SHEET 2.
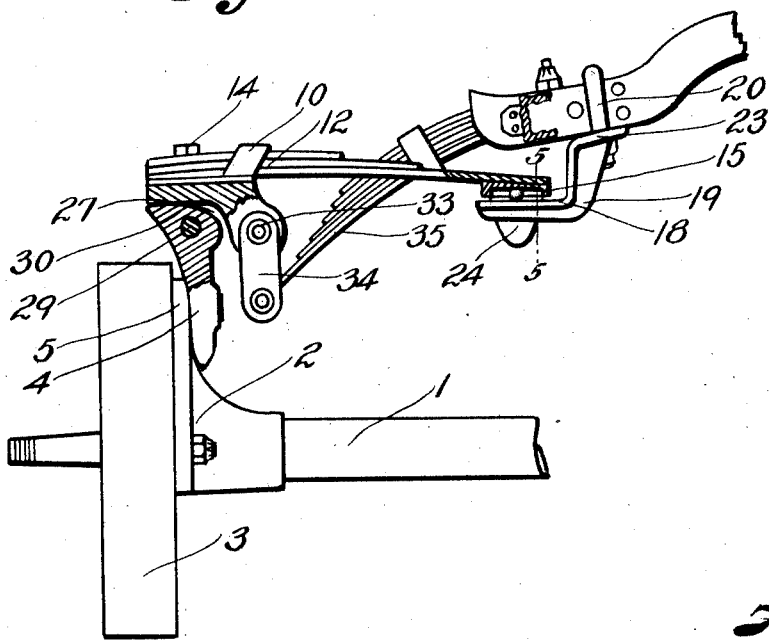
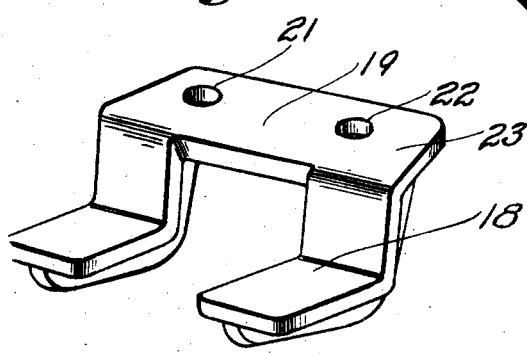
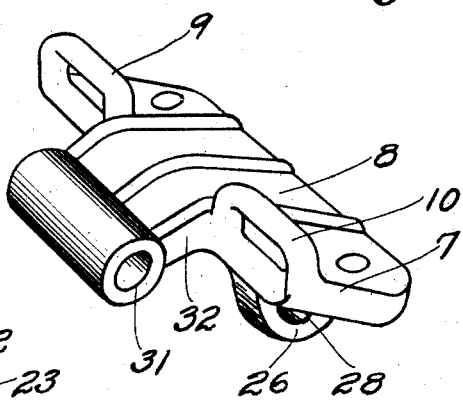
Inventor
Ray V. Converse.
By [signature]
Attorney

UNITED STATES PATENT OFFICE.

RAY V. CONVERSE, OF KANSAS CITY, MISSOURI.

SHOCK ABSORBER.

1,415,799. Specification of Letters Patent. Patented May 9, 1922.

Application filed October 11, 1920. Serial No. 416,132.

*To all whom it may concern:*

Be it known that I, RAY V. CONVERSE, a citizen of the United States, residing at Kansas City, in the county of Jackson and State of Missouri, have invented certain new and useful Improvements in Shock Absorbers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a shock absorber and particularly to a novel form of shock absorber which will permit the springs of a vehicle to function in the ordinary manner, the shock absorber being so arranged that the jolts and jars incident to the travel of the vehicle over an uneven road bed will be absorbed by the shock absorber and, therefore, will not be communicated to the body of the vehicle.

The shock absorber involves a construction particularly applicable for use in connection with trucks or heavy vehicles and the primary object is to provide a simplified construction which may be readily applied to existing motor vehicles in a convenient manner and, further, to provide a construction which will efficiently perform the intended function.

In the drawings,

Fig. 2 is a view partly in section and partly in elevation, showing the shock absorber applied.

Fig. 3 is a detail perspective view of a step bracket for one end of the shock absorber spring.

Fig. 4 is a detail perspective view of the hanger bracket, and

Figure 1:
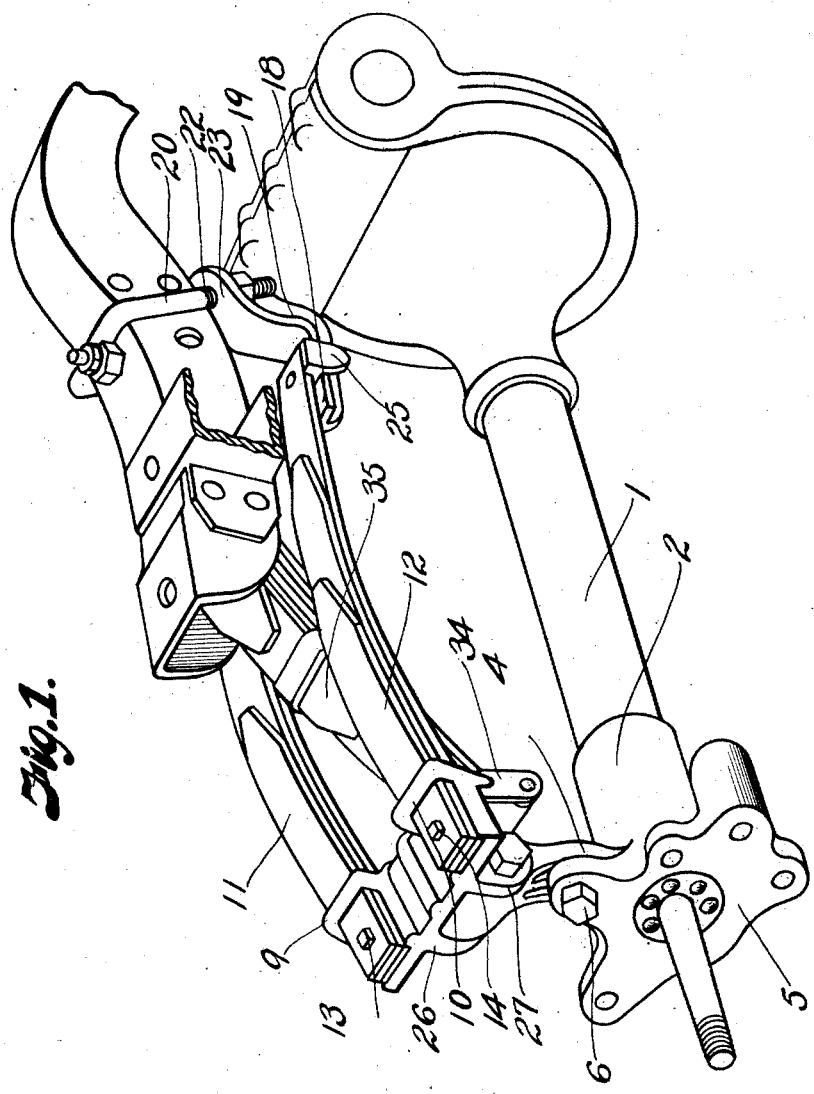
Fig. 1 is a perspective view of a shock absorber constructed in accordance with my invention.
Figure 5:
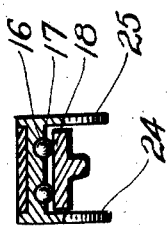
Fig. 5 is a cross sectional view on the line 5—5 of Fig. 2.

Referring now to the drawings by numerals of reference:

1 designates an axle carrying the usual sleeve 2, which fastens the brake drum 3 to the axle. The sleeve 2 supports an upstanding perch or bracket 4, which is secured to the flange 5 of the sleeve by a suitable fastening device such as a bolt 6. The perch 4 supports a hanger bracket 7, shown in detail in Fig. 4 as consisting of a plate 8 provided at one edge with upstanding spring loops 9 and 10, through which leaf springs 11 and 12 may extend (see Fig. 1), the ends of the leaf springs being secured in their seats by the loops 9 and 10 and provided with fastening devices 13 and 14.

The springs are made up of a plurality of leaves and the inner ends of the lower leaves are provided with inverted boxes or cups 15, which are formed with longitudinal grooves 16 to receive anti-friction bearings, shown as balls 17, which are adapted to roll upon the horizontal portions 18 of the step bearings 19 suspended from the rear bolster by U-bolts 20, which pass over the ends of the bolster and engage through the openings 21 and 22 in the top plate 23 of each of the step bearings, as clearly indicated in Figs. 1 and 2.

The inverted box-shaped ball races have depending portions 24 and 25 which overlie the longitudinal edges of the flat portions 18 of the step bearings 19 so that lateral play of the free ends of the leaf springs of the shock absorber will be prevented, the bearings, however, allowing the leaf springs 11 and 12 to freely ride upon the portions 18 of the step bearings, as will be apparent by reference to Fig. 2.

The hanger brackets 8 are provided with depending lugs or webs 26 and 27, having bearing openings 28 therein to receive the bolt or bearing 29 which passes through the perch and through said openings whereby the hanger bracket 8 is adapted to be pivotally secured with respect to the perch which supports it. The underside of the bracket 8 is relatively flat while the upper edge 30 of the perch is curved or cam-shaped so that the bracket 8 will roll over the same, there being a snubbing action when the shock absorber functions, as will be apparent hereinafter. The inner edge of the bracket 8 is formed with a barrel-shaped bearing 31, connected to the bracket proper by a web 32, the barrel receiving a bolt or pivot 33 for the links 34 which shackle the ordinary leaf spring 35 to the bracket 8, the leaf spring being fastened in any suitable manner to the channel-shaped bolster which carries the U-bolt 20.

When the parts are assembled and an upward jar is communicated to the end of the axle 1, there will be a snubbing action between the perch and the hanger bracket 8, the ends of the leaf springs bearing upon the step bracket to prevent the upward jar being communicated to the vehicle. The springs 35, however, are adapted to function in their normal way so that there is a double spring action due to the leaf springs 11 and 12 and the springs 35.

In other words, when the end of the axle 1 tends to rise with a sudden jolt, the upward movement will cause the inner ends of the springs 11 and 12 to press down on the step bearings in proportion to the extent of the upward impulse so that the shock will be absorbed before it can be communicated to the vehicle body. The ordinary vibration, however, due to the swaying of the vehicle under load in response to the spring 35 will not be interfered with since the vehicle frame may vibrate on the springs 35, the step bearings being adapted to move downwardly, slightly away from the free ends of the springs 11 and 12 for this purpose. The shock absorber, however, will resist any sudden upward movement of the vehicle body beyond a determined point; therefore, the occupants of the vehicle or the load will not be subjected to sudden shocks or vibrations and, as a result, the invention will function efficiently as a shock absorber with all its attendant advantages, these being so well understood that it is deemed unnecessary to state them here.

What I claim and desire to secure by Letters-Patent is:

1. In combination with vehicle body and axle members, a step bracket on one member, a perch on the other member, a bracket pivotally mounted on said perch, a leaf spring attached to said bracket and anti-friction members in the bearing member engaging the step bracket.

2. In combination with vehicle body and axle members, a step bracket on one member, a perch on the other member, a bracket pivoted to and having rolling contact with said perch, a leaf spring having one end shackled to said bracket, a box-bearing on the free end of the spring overlying the step bracket and anti-friction devices in the box-bearing engaging the step bracket.

3. In combination with a vehicle body and axle, a step bracket on the body, a perch on the axle, a bracket pivotally mounted on the perch, an absorber spring attached at one end to the bracket and bearing, at its other end on the step bracket and a body spring connected at one end to the body and having link connection at the other end with the bracket in said perch.

4. In combination with a motor vehicle, perches secured to opposite ends of the rear axle, pivoted brackets carried by the perches, parallel leaf springs carried by the pivoted brackets and having inwardly projecting free ends, box-shaped bearing members on the free ends of the springs, step brackets carried by the vehicle frame and extending beneath the box-shaped bearings on the free ends of the springs, anti-friction bearings between the step brackets and the box-shaped bearings, and connections between the pivoted brackets and the rear springs of the vehicle.

5. The combination with a motor vehicle axle and the body thereof, a perch carried by the motor vehicle axle, a pivoted bracket mounted on the perch, leaf springs carried by the pivoted bracket, a motor vehicle body frame, a step bracket carried by the motor vehicle body and extending beneath the free ends of the springs supported by the pivoted bracket, springs carried by the motor vehicle body and projecting in opposite directions to the springs on the brackets, and shackling means connecting the springs on the body to the pivoted bracket.

6. In a shock absorber, a perch having a curved upper end, a swinging bracket connected to the perch and rockable about the curved upper end, a spring shackle carried by the bracket, a spring connected to the shackle at one end, a vehicle body portion connected to the spring at the other end, a spring having one end rigidly fastened to the bracket and provided with a free end, a step bracket carried by the portion of the vehicle body to which the first named spring is secured, and an anti-friction bearing between the free end of the second mentioned spring and the step bracket.

7. A shock absorber comprising a pivoted bracket, a leaf spring carried by said bracket and having an inwardly projecting free end, a spring-supported body portion, a bracket rigidly carried by the body portion and having a part extending beneath the free end of the spring, and an anti-friction device between the free end of the spring and the portion of the bracket which extends therebeneath.

In testimony whereof I affix my signature.

RAY V. CONVERSE.